United States Patent
Fregnan

(10) Patent No.: US 8,100,049 B2
(45) Date of Patent: Jan. 24, 2012

(54) METHOD FOR CONTROLLING AND MANAGING THE WATER FLOW TO A COFFEE MACHINE PROVIDED WITH A WATER SOFTENER DEVICE OF ION EXCHANGE RESIN TYPE, AND COFFEE MACHINE FOR IMPLEMENTING THE METHOD

(75) Inventor: Andrea Fregnan, Dosson Di Casier (IT)

(73) Assignee: Elektra S.r.l., Dosson Di Casier (IT)

( * ) Notice: Subject to any disclaimer, the term of this patent is extended or adjusted under 35 U.S.C. 154(b) by 976 days.

(21) Appl. No.: 11/795,947

(22) PCT Filed: Jan. 24, 2006

(86) PCT No.: PCT/EP2006/000592
§ 371 (c)(1),
(2), (4) Date: Jul. 25, 2007

(87) PCT Pub. No.: WO2006/079500
PCT Pub. Date: Aug. 3, 2006

(65) Prior Publication Data
US 2008/0236400 A1 Oct. 2, 2008

(30) Foreign Application Priority Data
Jan. 27, 2005 (IT) .............................. VE2005A0005

(51) Int. Cl.
*A47J 31/057* (2006.01)
(52) U.S. Cl. ........................................................ 99/300
(58) Field of Classification Search .................... 99/286, 99/298, 290, 300
See application file for complete search history.

(56) References Cited

U.S. PATENT DOCUMENTS

| | | | | |
|---|---|---|---|---|
| 3,718,044 A | * | 2/1973 | Joyce et al. | 73/223 |
| 5,072,660 A | * | 12/1991 | Helbling | 99/280 |
| 6,107,924 A | * | 8/2000 | Kasai et al. | 340/627 |

FOREIGN PATENT DOCUMENTS

| | | |
|---|---|---|
| DE | 44 22 143 A1 | 1/1996 |
| DE | 44 46 731 A1 | 6/1996 |
| EP | 0 749 720 A | 12/1996 |
| GB | 496 768 A | 12/1938 |

OTHER PUBLICATIONS
Machine Translation of DE 44 46 731.*

* cited by examiner

*Primary Examiner* — Duc Nguyen
*Assistant Examiner* — Mark Woodall
(74) *Attorney, Agent, or Firm* — Themis Law

(57) ABSTRACT

A method for controlling and managing the water flow to a coffee machine provided with an ion exchange water softener device, characterised by: determining, on the basis of the hardness of the mains water and the type of resins, the maximum volume of water treatable by said resins before saturated, feeding mains water to the coffee machine through said water softener device while measuring said water flow, the value of which is compared with the maximum treatable water volume, and on noting that the water volume which has passed through said water softener corresponds to the memorized maximum treatable water volume, directly feeding the mains water to the coffee machine while by-passing said water softener device, and in the meantime, regenerating the resins with brine and washing said resins on termination of said regeneration, and finally, again feeding water to the machine via said water softener device.

20 Claims, 2 Drawing Sheets

METHOD FOR CONTROLLING AND MANAGING THE WATER FLOW TO A COFFEE MACHINE PROVIDED WITH A WATER SOFTENER DEVICE OF ION EXCHANGE RESIN TYPE, AND COFFEE MACHINE FOR IMPLEMENTING THE METHOD

The present invention relates to a method for controlling and managing the water flow to a coffee machine provided with a water softener device of ion exchange resin type, and a coffee machine for implementing the method.

Coffee machines for bars are known to be provided at their inlet with a water softener device, the purpose of which is to remove the Ca and Mg ions present in the water feeding the machine.

A large presence of such ions increases the water hardness leading to limestone deposition both in the hydraulic circuit and in the boiler, with consequent maloperation and faults.

The water softener device consists essentially of a purifier containing an ion exchange resin which removes the Ca and Mg ions by ion exchange, to subtract them from the water.

When the ion exchange resin is saturated, it is regenerated by loading a certain quantity of salt into the purifier and feeding water to dissolve it. This solution removes the Ca and Mg ions which have saturated the resin and is then discharged to the outside. After regeneration, water is fed to rinse the resin.

In the meantime, the machine operates with unsoftened water, fed by by-passing the purifier.

The water flows are all opened and closed generally by manually operating one- or two-way valves in complicated sequences.

Consequently as all these operations are manual, a purifier of large dimensions has to be used in order to reduce the number of regenerations to be carried out. The purifier can therefore not be housed inside the coffee machine, resulting in machine installation and space requirement problems.

According to the invention, these drawbacks are eliminated by a method for controlling and managing the water flow to a coffee machine provided with an ion exchange water softener device as described hereafter.

Figure 1:
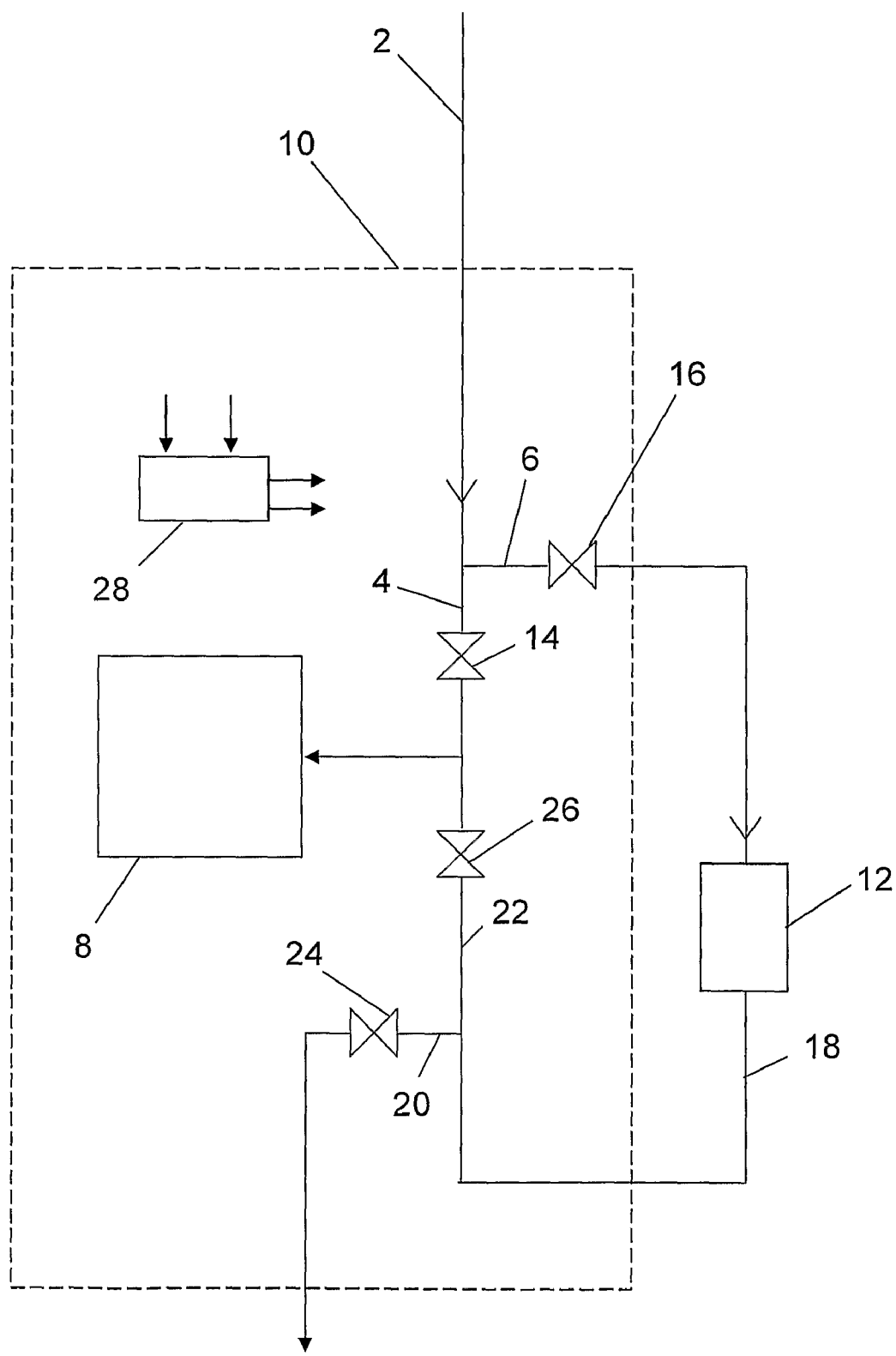
Figure 2:
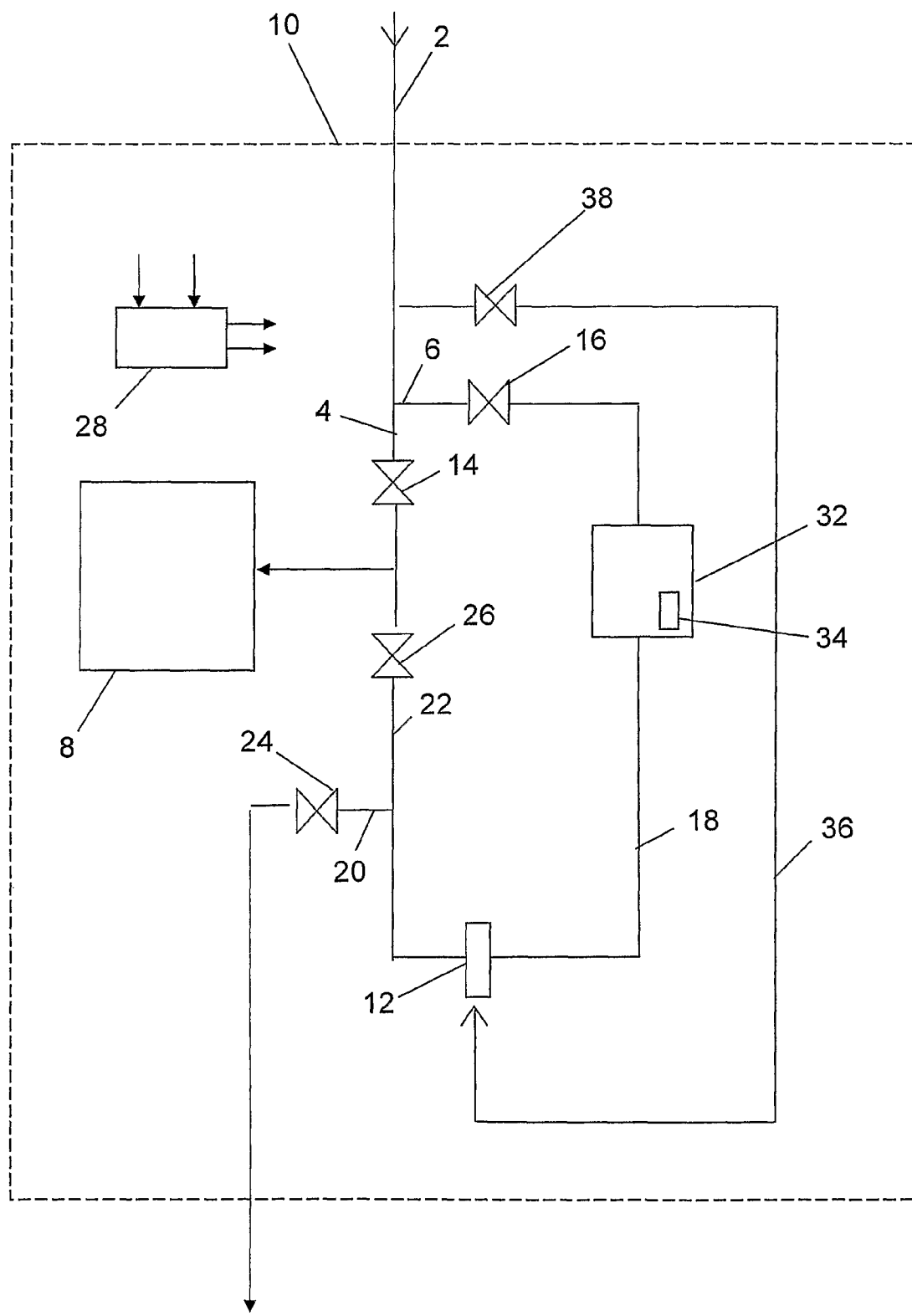

A preferred embodiment and a variant of the present invention are further clarified hereinafter with reference to the accompanying drawings, in which:

FIG. 1 is a schematic view of a coffee machine with water softener device according to the invention, and FIG. 2 is a view of a variant.

As can be seen from the figures, the coffee machine with water softener device comprises essentially a pipe 2 connected to the water main and branching into two conduits 4, 6, one 4 of which is connected to the rest 8 of the coffee machine 10, and the other 6 is connected to a purifier 12 external to the machine and containing an ion exchange resin.

Two solenoid valves, 14 and 16 respectively, are connected into the conduits 4 and 6.

A conduit 18 leaves the exit of the purifier 12 to branch into two further conduits, namely a discharge conduit 20 and a conduit 22 connected to the conduit 4 between the solenoid valve 14 and the rest 8 of the machine 10.

The conduit 20 is provided with a solenoid valve 24, a similar solenoid valve 26 being provided in the conduit 22.

The solenoid valves 14, 16, 20 and 22 are controlled by a control unit 28 in which the volume of softened water obtainable before having to regenerate the purifier is memorized for all possible water hardness values. These data are inserted into a database provided in the machine memory on manufacture and derive from general chemical considerations and the knowledge of the manufacturer.

The control unit continuously measures the water consumed by the coffee machine, both by flow sensors (not shown in the drawings), also required for metering the dispensed coffees, and by integrating the operating time of the pump (not shown in the drawings) feeding the machine boiler.

The device of the invention operates in the following manner.

When the machine is installed in the bar, the hardness of the water entering the conduit 2 is measured and the value stored in the control unit 28.

In this manner, on the basis of the hardness/resin volume data contained in the database, the control unit memorizes the total water volume which can be used by the machine before having to regenerate the resins.

During normal machine operation, the control unit 28 maintains the solenoid valves 14 and 24 closed and the solenoid valves 16 and 26 open, so that the mains water passes through the conduit 6, then through the purifier 12 to undergo softening, then through the conduits 18 and 22 to enter the rest of the machine 8.

When the control unit senses that the quantity of softened water consumed by the coffee machine corresponds to the value predetermined by the control unit 28, it closes the solenoid valves 16 and 26 and opens the solenoid valve 14, to enable the machine to operate but with untreated water. The control unit also opens the solenoid valve 24 to depressurize the purifier.

At the same time the control unit feeds a signal to the operator, for example on the machine display, informing that the purifier 12 must be recharged with salt. After effecting this recharge, the operator operates a control indicating that recharging has been completed, on which the control unit opens the solenoid valve 16 to enable a quantity of water to flow for a predetermined time in order to regenerate all the resins and then rinse them.

When this step is complete, the solenoid valves 24 and 14 are closed and the solenoid valve 26 reopened to feed water already treated by the purifier 12 to the rest 8 of the machine.

In a further embodiment shown in FIG. 2, the device also comprises a vessel 32 inserted into the machine, and a conduit 36. The conduit 36 extends from the conduit 2 upstream of the point at which the conduits 4 and 6 branch, to reach the purifier 12, and is provided with a solenoid valve 38 positioned before the purifier. The vessel 32 contains a quantity of salt equal to the quantity of salt present in the preceding example plus a small quantity of water, in order to form supersaturated brine. The vessel 32 is provided with a density sensor 34 to indicate the presence or absence of salt in the vessel.

In this embodiment, the purifier 12 contains a smaller resin volume than in the preceding embodiment (for example one eighth), so that it can be housed in the coffee machine.

This embodiment of the device operates in a manner substantially similar to that of the preceding embodiment with regard to solenoid valve operation.

However as the volume of ion exchange resin is, as already stated, only one eighth of the preceding embodiment, regeneration must be performed eight times more frequently than in the preceding embodiment.

This regeneration is performed with a water quantity ($\frac{1}{8}$ of that used previously) which, when the solenoid valve 16 is opened, passes through the vessel 32 to dissolve a quantity of salt such as to form saturated brine for regenerating the resins in the purifier 12.

Given the water quantity used, the salt quantity is sufficient for eight regenerations.

During regeneration, the control unit initially opens the solenoid valve 16 and closes the solenoid valve 38, to effect resin regeneration with the brine, then reverses the opening/closure of these two solenoid valves to rinse the purifier with mains water.

When the density sensor 34 senses the lack of salt, a signal is automatically sent to the operator to load salt as in the preceding embodiment. In this embodiment, the sensor which senses that salt loading has taken place automatically activates the regeneration cycle by means of the control system 28.

In a modified embodiment, not shown in the drawings, the solenoid valve 26 is replaced by a non-return valve.

In another modified embodiment the invention uses a flow sensor connected into the mains water inlet line to replace the use of the counting and integration system based on the flow sensors already present in the machine.

The invention claimed is:

1. A method of controlling and managing water flow to a coffee machine comprising:
   providing a water softener having a resin;
   determining a maximum treatable volume of water that is treatable by said resin before being saturated based on hardness of the water and type of the resin;
   feeding the water from a water mains to the coffee machine through said water softener while measuring flow of the water to provide a measured water flow;
   comparing an operating water volume determined from the measured water flow with the maximum treatable water volume;
   interrupting the feeding of the water to the coffee machine through the water softener by directly supplying the coffee machine from the water mains while by-passing the water softener when the operating water volume reaches the maximum treatable water volume;
   regenerating and then washing the resin; and
   restoring the feeding of the water to the coffee machine from the water mains via said water softener after the step of regenerating and washing the resin.

2. The method as claimed in claim 1, further comprising generating a signal indicating a need to regenerate the resin when the operating water volume corresponds to the maximum treatable water volume.

3. The method as claimed in claim 1, wherein regenerating the resin comprises regenerating the resin with brine by adding salt to the water softener.

4. The method as claimed in claim 3, further comprising warning an operator of a need to feed the salt into the water softener.

5. The method as claimed in claim 3, further comprising informing an operator when the salt has been fed into the water softener.

6. The method as claimed in claim 1, wherein regenerating the resin comprises regenerating the resin with brine and withdrawing a required brine quantity from a periodically rechargeable vessel.

7. The method as claimed in claim 1, further comprising preparing a supersaturated solution which is diluted with at least some of the water for feeding to the water softener.

8. The method as claimed in claim 1, further comprising measuring the flow of the water with one or more flow sensors positioned in a water inlet line.

9. The method as claimed in claim 1, further comprising measuring the flow of the water by integrating an operating time of a pump which feeds a machine boiler.

10. A coffee machine comprising:
    a water softener having a resin;
    a circuit distributing water inside the coffee machine, the water being provided by a water mains;
    a control unit collecting information about the water and controlling flow of the water through said circuit;
    first shut-off means having a first open position and a first closed position, the first shut-off means being configured to enable water flow when in the first open position to a first portion of said circuit, such to direct the water flow to the water softener, and to prevent the water flow to the water softener when in the first closed position, the first shut-off means being controlled by said control unit; and
    second shut-off means having a second open position and a second closed position, the second shut-off means being configured to enable the water flow to the coffee machine when in the second open position, such to feed the coffee machine with the water from the water mains through a second portion of said circuit,
    wherein the control unit causes the second shut-off means to assume the open position when the first shut-off means assume the closed position, such to allow regeneration of the resin in the water softener.

11. The coffee machine as claimed in claim 10, wherein said first and said second shut-off means are solenoid valves.

12. The coffee machine as claimed in claim 11, wherein said second shut-off means are in the closed position when the water flows through the first portion of the circuit during routine operation of the coffee machine.

13. The coffee machine as claimed in claim 11, wherein said solenoid valves are non-return valves.

14. The coffee machine as claimed in claim 10, further comprising a brine vessel, wherein the first and the second shut-off means, the water softener and the brine vessel are housed within a body of the machine.

15. The coffee machine as claimed in claim 10, wherein the control unit is connected to a display indicating a need for recharging the water softener with salt.

16. The coffee machine as claimed in claim 10, further comprising a vessel for containing salt and water such to form a brine for regenerating said resin.

17. The coffee machine as claimed in claim 16, wherein a density sensor is situated in the vessel, the density sensor being configured to sense lack of the salt.

18. The coffee machine as claimed in claim 10, wherein the control unit contains a database having water volume information stored therein that is related to water hardness values.

19. The coffee machine as claimed in claim 10, further comprising one or more water flow measurement sensors.

20. The coffee machine as claimed in claim 19, wherein said one or more sensors are positioned along a conduit of a water inlet line.

* * * * *